May 24, 1932. A. BÜCHI 1,859,693
INTERNAL COMBUSTION ENGINE
Filed Aug. 6, 1926  2 Sheets-Sheet 1

Inventor:
Alfred Büchi
By Henry Orth Jr.
Atty.

May 24, 1932.    A. BÜCHI    1,859,693
INTERNAL COMBUSTION ENGINE
Filed Aug. 6, 1926    2 Sheets-Sheet 2

Inventor
Alfred Büchi
By [signature]
Atty.

Patented May 24, 1932

1,859,693

UNITED STATES PATENT OFFICE

ALFRED BÜCHI, OF WINTERTHUR, SWITZERLAND

INTERNAL COMBUSTION ENGINE

Application filed August 6, 1926, Serial No. 127,629, and in Switzerland August 12, 1925.

This invention refers to an improved manner of constructing the head parts or covers for the cylinders of internal combustion engines.

According to the invention the combustion space is formed on one or both sides of the piston by at least one conically shaped and restricted cavity provided in the cylinder cover and extending longitudinally of the cylinder. The valves serving to regulate the admission of the charge and the exhaust, respectively, are arranged laterally of the axis of the cylinder at the end of the combustion space remote from the piston and are connected to the combustion space by channels transversely and symmetrically disposed to the axis of the cylinder. The valves are spaced from the part in which the highest combustion temperatures are present for the purpose of arranging the apertures in the inner wall of the cylinder cover and required to establish communication between the combustion space and said regulating valves at places of small diameter where a small wall thickness, which is less affected by temperature stresses, may be provided for withstanding the internal pressure of the cylinder.

The cylinder cover may consist of one piece or of two concentric parts which together form the wall confining the combustion space. With smaller engines the cylindrical part of the cylinder containing the liner may be made in one with the cylinder cover. The regulating or closing valves may be valves of the mushroom type or double seated valves, and two or more of each of such valves may be provided. The channels which connect the combustion space with the openings controlled by the closing valves, may be tangentially arranged to the combustion space in order to impart a rotating movement about the axis of the cylinder to the incoming or leaving gases. The center lines of the openings leading from inlet valve to combustion chamber and from there to the exhaust do not pass through the axis of the combustion chamber in order to impart to the gases in this chamber a rotating movement. Advantageously the width of these channels corresponds substantially to the diameter of the opening controlled by the valve whereby the clearance space of the cylinder is increased as little as possible by these channels. The channels may be so arranged that they are partly swept by the fuel jet entering the combustion space.

Constructional examples of the subject matter of the present invention are illustrated on the accompanying drawings, in which.

Figure 1:
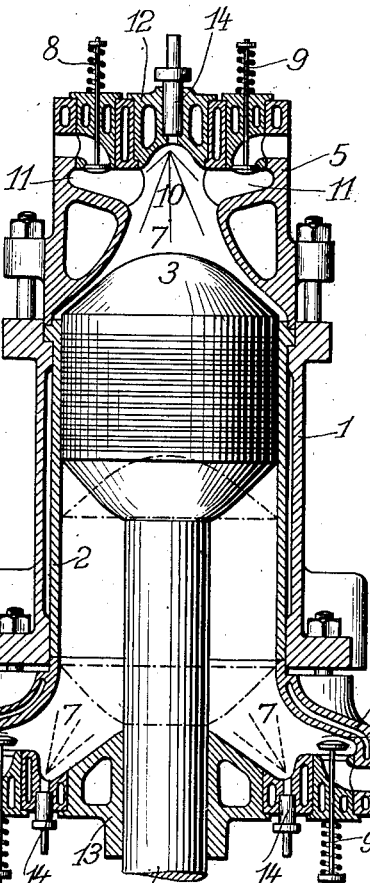
Figure 1 is a diagrammatic longitudinal section through the cylinder of a double-acting internal combustion engine.

In Figure 1, 1 denotes the shell of the cylinder of a double-acting internal combustion engine. A liner 2 is inserted in said cylinder and a piston 3 reciprocates in the latter; the power acting on the piston is transmitted by the piston rod 4 to the ordinary connecting rod, and a crank gear not illustrated in the drawings. 5 designates the upper cylinder cover and 6 is the lower cylinder cover constructed in accordance with the present invention. In construction at least one cavity 7, the diameter of which is considerably smaller than the diameter of the cylinder liner 2, is provided on both sides of the piston, and the valves 8 and 9 serving to control the admission of the charge and the exhaust respectively are connected to the combustion space by channels 11 arranged transverse to the axis of the cylinder. At the end 10 one conically shaped combustion space 7 is arranged and at the opposite end of the cylinder two conically shaped combustion spaces 7 are provided extending longitudinally of the cylinder. The closing valves 8 and 9 are near the outer ends of channels 11 and distanced from the part in which the highest combustion temperatures are present, i. e., from the space 7. The apertures in the inner wall of the cylinder cover which are necessary to permit the combustion gases to flow from the combustion space to the closing valves 8 and 9 are arranged in a part in which the cylinder has small diameter and in which a small wall thickness, which is less affected by temperature stresses, is required. The cylinder covers 5 or 6 respectively may be made in one piece or they may consist of two concentric parts such as 5 and 12 and 6 and 13 in Figure 1. The two parts confine the combustion spaces 7 in the form of conically shaped cavity or cavities extending in the longitudinal direction of the cylinder. The smaller valves 14 may be arranged in the smaller part 12 of the cover with the cover 5, or in the larger part of the cover with the cover 6, Fig. 1.

Similarly the branches for connecting up the supply of starting air, for safety valves and for indicators, which are not shown in Figure 1, may be arranged in one or the other of the two parts of the cylinder cover. The upper and lower end faces of the piston 3 are much curved so that the constricted space 7 is closed towards the piston by a smaller area when the piston is in its dead centre position.

Figure 2:
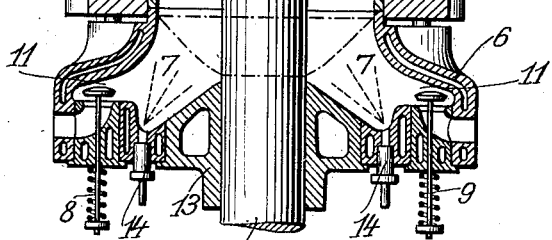
Figs. 2 and 3 illustrate in longitudinal section and in horizontal section along line III—III in Fig. 2.
Figure 2:
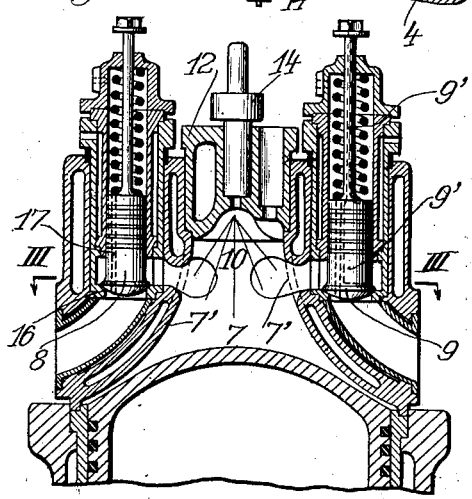
Figure 3:
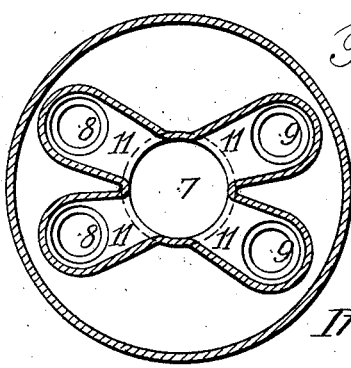
Figure 4:
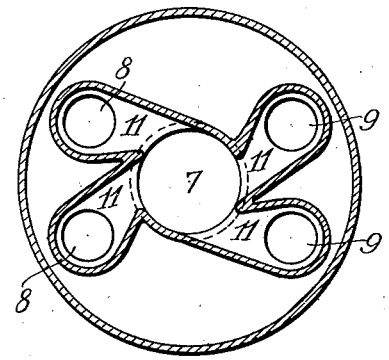
Fig. 4 is a modification of Fig. 3.

The constructional example illustrated in Figs. 2 and 3 differs from that described above with reference to Figure 1 inasmuch as a modified type of valve is shown. Parts corresponding to those of Figure 1 are designated by similar reference numerals and the description of these parts is not repeated. To one side of the combustion space 7 two valves are arranged. The latter consist of single seated valves 8 which are provided with a piston-like upper extension. The diameter of the latter is so chosen that the pressure present in the combustion chamber is only effective on an annular strip the width of which corresponds to the difference in the diameters of the valve seat 16 and of the equalizing piston which is provided with piston rings. In order to prevent a pressure acting on the lower face of the valve from exerting a considerable force in the upward direction the spaces above and below the valve may communicate with each other, for instance by bores 17, so that a balancing of the pressure always occurs. As is shown in Figure 3 to each side of the combustion space 7 two valves 8 and 9, respectively, are provided, from which separate channels 11 communicate with the combustion space 7 whose inner walls are shown at $7^1$.

The two valves of a pair 8 or 9 arranged beside each other on the same side of the combustion space may serve the same purpose, for instance, 8 may be the inlet valves and 9 exhaust valves, in order to obtain a unidirectional flow of the gases. The width of the channels 11 measured in the direction transverse to the flow of the gases may be such that a jet of gas is admitted having a diameter that corresponds approximately to the diameter of the openings controlled by the valves. The channels 11 may be arranged relatively to the combustion space so that they are partly swept by the fuel jet entering the said space.

In order to protect the valves against the action of the heat they may be internally cooled, said valves being provided with water chambers $9^1$ supplied with water through their stems.

In Figure 2 the inner wall of the cover which tapers inwardly in the upward direction is shown and indicates that the constructions according to the present invention permit the provision of apertures establishing communication between the channels leading to the valves and the combustion chamber at points at which the thickness of the wall is small and where small temperature stresses have to be expected.

Obviously, instead of single seated valves double seated valves may be used.

Figure 5:
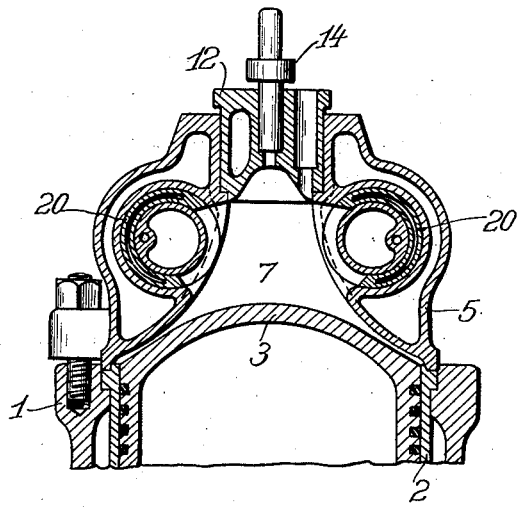
Figs. 5 and 6 illustrate a vertical section and a horizontal section respectively through the cylinder cover in which piston valves are provided as principal closing valves.
Figure 6:
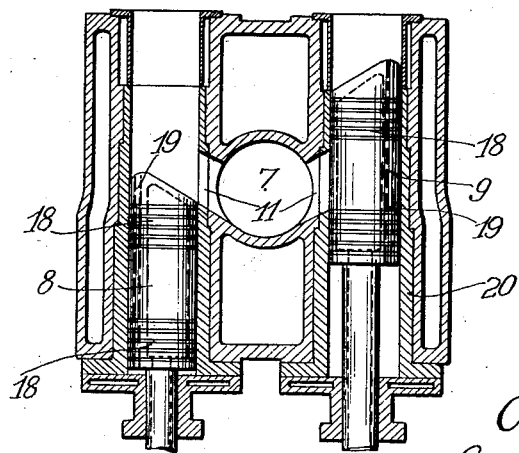

Figs. 5 and 6 illustrate a constructional example in which piston valves are provided. These piston valves 8 and 9 are horizontally disposed laterally of the combustion chamber. The piston valves are provided with piston rings 18 in the same manner as the pistons of the engine. The piston rings 18 are arranged on both end parts of the piston valves so that with the latter in their closed position as is indicated on the right hand side of Figure 5 they are tight at each side of the channel 11. The hollow piston valves 8 and 9 are advantageously internally cooled and the piston valves may be provided with bores 19 connecting the two ends of the piston valves with each other in order to obtain equalization of pressure on both ends to relieve the latter completely. The piston valves are reciprocated in liners 20 which may be cooled. For actuating the piston valves any known means such as eccentrics, cam discs and the like may be utilized.

I claim—

1. In an internal combustion engine in combination, a cylinder, a piston therein having a convex end, a cylinder head containing intake and exhaust valves of the piston type; a tapered combustion chamber extending substantially in the direction of the axis of the combustion cylinder, the diameter of said combustion chamber increasing towards the piston with progressively increasing increment, said combustion chamber forming the end of the cylinder and communicating with it by an opening of the diameter of said cylinder, the convex end of the piston closing said combustion chamber towards the cylinder space in the top dead center of the piston, channels arranged transversely to the axis of said combustion chamber, an intake or exhaust valve at the remote end of each channel, said channel situated where the diameter of the combustion chamber is small so that but a small thickness of the confining walls is required.

2. In an internal combustion engine in combination, a cylinder, a piston therein having a convex end, a cylinder head containing intake and exhaust valves of the piston type, a tapered combustion chamber extending substantially in the direction of the axis of the combustion cylinder, the diameter of said combustion chamber increasing towards the piston with progressively increasing increment, said combustion chamber forming the end of the cylinder and communicating with it by an opening of the diameter of said cylinder, the convex end of the piston closing said combustion chamber towards the cylinder space in the top dead center of the piston, channels arranged transversely to the axis of said combustion chamber, an intake or exhaust valve at the remote end of each channel, said channels situated where the diameter of the combustion chamber is small so that but a small thickness of the confining walls is required, the channel with the intake valve being tangential to said combustion chamber to impart a rotating motion to the incoming charge, the exhaust channel being also tangential to said combustion chamber in the direction of rotation of the charge.

3. In an internal combustion engine in combination, a cylinder, a piston therein having a convex end, a cylinder head containing intake and exhaust valves of the piston type, a tapered combustion chamber extending substantially in the direction of the axis of the combustion cylinder, the diameter of said combustion chamber gradually and progressively increasing to that of the combustion cylinder, said combustion chamber forming the end of the cylinder and communicating with it by an opening of the diameter of said cylinder, the convex end of the piston closing said combustion chamber towards the cylinder space in the top dead center of the piston, channels arranged transversely to the axis of said combustion chamber, an intake or exhaust valve at the remote end of each channel, said channels situated where the diameter of the combustion chamber is small, so that but a small thickness of the confining walls is required, the channel with the intake valve being tangential to said combustion chamber to impart a rotating motion to the incoming charge, the exhaust channel being also tangential to said combustion chamber in the direction of rotation of the charge, said exhaust and intake valves being water-cooled and the valve head so shaped that in the open position the valve heads lie in the extension of said channels.

4. In an internal combustion engine in combination, a cylinder, a piston therein having a convex end, a cylinder head containing intake and exhaust valves of the piston type, a tapered combustion chamber extending substantially in the direction of the axis of the combustion cylinder, the diameter of said combustion chamber increasing towards the piston with progressively increasing increment, said combustion chamber forming the end of the cylinder and communicating with it by an opening of the diameter of said cylinder, the convex end of the piston closing said combustion chamber towards the cylinder space in the top dead center of the piston, channels arranged transversely to the axis of said combustion chamber, an intake or exhaust valve at the remote end of each channel, said channel situated where the diameter of the combustion chamber is small, so that but a small thickness of the confining walls is required, the channel with the intake valve being tangential to said combustion chamber to impart a rotating motion to the incoming charge, the exhaust channel being also tangential to said combustion chamber in the direction of rotation of the charge, said exhaust and intake valves having piston rings and being located in parallel cylindrical bores of the cylinder head.

In testimony whereof, I have signed my name to this specification.

ALFRED BÜCHI.